(12) United States Patent
Schwarze et al.

(10) Patent No.: US 10,543,529 B2
(45) Date of Patent: Jan. 28, 2020

(54) APPARATUS FOR PRODUCING A THREE-DIMENSIONAL WORK PIECE WHICH INCLUDES A HEATING SYSTEM

(71) Applicant: SLM Solutions Group AG, Luebeck (DE)

(72) Inventors: Dieter Schwarze, Luebeck (DE); Toni Adam Krol, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 386 days.

(21) Appl. No.: 15/293,781

(22) Filed: Oct. 14, 2016

(65) Prior Publication Data
US 2017/0106445 A1 Apr. 20, 2017

(30) Foreign Application Priority Data
Oct. 16, 2015 (EP) ..................... 15190170

(51) Int. Cl.
*B22F 3/105* (2006.01)
*B33Y 10/00* (2015.01)
(Continued)

(52) U.S. Cl.
CPC ........ *B22F 3/1055* (2013.01); *B23K 15/0086* (2013.01); *B23K 15/02* (2013.01);
(Continued)

(58) Field of Classification Search
CPC ........... B22F 3/1055; B22F 2003/1042; B22F 2003/1056; B22F 2003/1057; B33Y 10/00;
(Continued)

(56) References Cited

U.S. PATENT DOCUMENTS 5,017,317 A 5/1991 Marcus
5,508,489 A * 4/1996 Benda ................... B22F 3/1055
219/121.76
(Continued)

FOREIGN PATENT DOCUMENTS

CN 104136149 A 11/2014
EP 2335848 A1 6/2011
(Continued)

OTHER PUBLICATIONS

Zhou, Bingkun, et al. "Efficient, Frequency-Stable Laser-Diode-Pumped Nd:YAG Laser." Optics Letters, vol. 10, No. 2, 1985, p. 62 (Year: 1985).*

(Continued)

*Primary Examiner* — Kevin E Yoon
*Assistant Examiner* — Ryan L Heckman
(74) *Attorney, Agent, or Firm* — Taft Stettinius & Hollister LLP

(57) ABSTRACT

An apparatus for producing a three-dimensional work piece comprises a carrier to receive a layer of raw material powder, a control unit, an irradiation system adapted to selectively irradiate electromagnetic or particle radiation onto the layer of raw material powder applied onto the carrier, wherein the control unit controls the operation of the irradiation system in such a manner that the raw material powder is heated to a first temperature which allows sintering and/or melting of the raw material powder in order to generate a layer of the three-dimensional work piece, and a heating system adapted to selectively irradiate electromagnetic or particle radiation onto the layer of raw material powder applied onto the carrier, wherein the control unit is adapted to control the operation of the heating system in such a manner that the raw material powder is heated to a second temperature that is lower than the first temperature.

20 Claims, 1 Drawing Sheet

(51) Int. Cl.
  *B33Y 30/00*    (2015.01)
  *B33Y 50/02*    (2015.01)
  *B23K 26/342*   (2014.01)
  *B23K 26/70*    (2014.01)
  *B23K 15/00*    (2006.01)
  *B23K 15/02*    (2006.01)
  *B28B 1/00*     (2006.01)
  *B22F 3/10*     (2006.01)

(52) U.S. Cl.
  CPC .......... *B23K 26/342* (2015.10); *B23K 26/702* (2015.10); *B28B 1/001* (2013.01); *B33Y 10/00* (2014.12); *B33Y 30/00* (2014.12); *B33Y 50/02* (2014.12); *B22F 2003/1042* (2013.01); *B22F 2003/1057* (2013.01)

(58) Field of Classification Search
  CPC ...... B33Y 30/00; B33Y 50/02; B23K 26/144; B23K 26/342; B23K 26/702; B23K 15/0086; B23K 15/02; B23K 26/12; B23K 26/127; B28B 1/001; Y02P 10/295
  See application file for complete search history.

(56) References Cited

U.S. PATENT DOCUMENTS

| | | | |
|---|---|---|---|
| 9,114,478 B2* | 8/2015 | Scott | B29C 64/20 |
| 2013/0064706 A1 | 3/2013 | Schwarze et al. | |
| 2013/0270750 A1* | 10/2013 | Green | B22F 3/1055 |
| | | | 264/497 |
| 2014/0334924 A1 | 11/2014 | Satzger et al. | |
| 2015/0004045 A1 | 1/2015 | Ljungblad | |
| 2015/0064048 A1* | 3/2015 | Bessac | B22F 3/24 |
| | | | 419/29 |

FOREIGN PATENT DOCUMENTS

| | | |
|---|---|---|
| EP | 2859973 A1 | 4/2015 |
| EP | 2878409 A1 | 6/2015 |

OTHER PUBLICATIONS

Notification of Reasons for Refusal, JP2016-198603, dated Sep. 5, 2017, 13 pages.
European Search Report, EP15190170.9, dated Apr. 20, 2016, SLM Solutions Grup AG, 8 pages.
China National Intellectual Property Administration, First Office Action in corresponding application No. 201610905477.3, dated Jul. 22, 2019, 10 pp.

* cited by examiner

APPARATUS FOR PRODUCING A THREE-DIMENSIONAL WORK PIECE WHICH INCLUDES A HEATING SYSTEM

TECHNICAL FIELD

The present invention relates to an apparatus for producing a three-dimensional work piece by irradiating layers of a raw material powder with electromagnetic or particle radiation. Furthermore, the invention relates to a method for operating an apparatus of this kind.

BACKGROUND

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

EP 2 859 973 A1 describes a powder processing arrangement for use in an apparatus for producing three-dimensional work pieces by selectively irradiating a raw material powder with electromagnetic or particle radiation, wherein a carrier element comprises a build section adapted to carry a raw material powder layer while being selectively irradiated with electromagnetic or particle radiation and at least one transfer section adapted to carry a raw material powder layer prior to being selectively irradiated with electromagnetic or particle radiation. A heating device is adapted to preheat the raw material powder carried by the transfer section of the carrier element prior to being applied to the build section of the carrier element so as to form the raw material powder layer to be selectively irradiated with electromagnetic or particle radiation.

Further, EP 2 878 409 A1 discloses a method and a device for controlling an irradiation system for use in an apparatus for producing a three-dimensional work piece and comprising a first and the second irradiation unit. A first and a second irradiation area are defined on a surface of the carrier adapted to receive a layer of raw material powder. A layer of raw material powder applied onto the carrier in the first irradiation area is irradiated by the first irradiation unit, wherein the operation of the first irradiation unit is controlled in such a manner that the raw material powder is preheated. Thereafter, the layer of raw material powder applied onto the carrier in the first irradiation area is irradiated by means of the second irradiation unit, wherein the operation of the second irradiation unit is controlled in such a manner that the raw material powder is heated to a temperature which allows sintering and/or melting of the raw material powder in order to generate a layer of the three-dimensional work piece. While the first irradiation unit irradiates a layer of raw material powder applied onto the carrier in the first irradiation area, a layer of raw material powder applied onto the carrier in the second irradiation area is irradiated by the second irradiation unit. Furthermore, while the first irradiation unit irradiates a layer of raw material powder applied onto the carrier in the second irradiation area, a layer of raw material powder applied onto the carrier in the first irradiation area is irradiated by the second irradiation unit.

SUMMARY

The invention is directed at the object of providing an apparatus for producing a three-dimensional work piece by irradiating layers of a raw material powder with electromagnetic or particle radiation which allows the production of a particularly high-quality three-dimensional work piece. Furthermore, the invention is directed at the object of providing a method for operating an apparatus of this kind.

This object is addressed by an apparatus as defined in claim 1 and a method as defined in claim 10.

An apparatus for producing a three-dimensional work piece comprises a carrier adapted to receive a layer of raw material powder. The carrier may be disposed in a process chamber of the apparatus and may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. The process chamber may be sealable against the ambient atmosphere, i.e. against the environment surrounding the process chamber, in order to be able to maintain a controlled atmosphere, in particular an inert atmosphere within the process chamber. The raw material powder to be received on the carrier preferably is a metallic powder, in particular a metal alloy powder, but may also be a ceramic powder or a powder containing different materials. The powder may have any suitable particle size or particle size distribution. It is, however, preferable to process powders of particle sizes <100 μm.

The apparatus further comprises a control unit which preferably is designed in the form of an electronic control unit. An irradiation system of the apparatus is adapted to selectively irradiate electromagnetic or particle radiation onto the layer of raw material powder applied onto the carrier from a sintering/melting radiation emission plane. The control unit is adapted to control the operation of the irradiation system in such a manner that the raw material powder is heated to a first temperature which allows a site-selective sintering and/or melting of the raw material powder in order to generate a layer of the three-dimensional work piece.

The irradiation system may comprise a sintering/melting radiation source and at least one optical unit for guiding and/or processing a sintering/melting radiation beam emitted by the sintering/melting radiation source. The optical unit may comprise optical elements such as an object lens, in particular an f-theta lens, and a scanner unit, the scanner unit preferably comprising a diffractive optical element and a deflection mirror. The irradiation system may comprise only one irradiation unit or a plurality of irradiation units each being adapted to emit electromagnetic or particle radiation which allows a site-selective sintering and/or melting of the raw material powder from the sintering/melting radiation emission plane.

Finally, the apparatus comprises a heating system adapted to selectively irradiate electromagnetic or particle radiation onto the layer of raw material powder applied onto the carrier from a heating radiation emission plane that is different from the sintering/melting radiation emission plane. A heating radiation beam emitted by the heating system thus is directed across the raw material powder layer applied onto the carrier in a site-selective manner similar to the sintering/melting radiation beam emitted by the irradiation system. The sintering/melting radiation beam emitted by the irradiation system and the heating radiation beam emitted by the heating system, however, originate from different planes and are independent from each other. The control unit is adapted to control the operation of the heating system in such a manner that the raw material powder is heated to a second temperature that is lower than the first temperature.

The heating system may comprise a heating radiation source and at least one optical unit for guiding and/or processing the heating radiation beam emitted by the heating radiation source. Like the optical unit of the irradiation system, also the optical unit of the heating system may comprise optical elements such as an object lens, in particular an f-theta lens, and a scanner unit, the scanner unit preferably comprising a diffractive optical element and a deflection mirror.

For example, the raw material powder, upon being irradiated by the electromagnetic or particle radiation emitted by the heating system, may be heated to a temperature below its sintering and/or melting temperature. It is, however, also conceivable that the raw material powder, upon being irradiated by the radiation emitted by the heating system, is partially or entirely melted or maintained in the melted state. However, even if the raw material powder, upon being irradiated by the radiation emitted by the heating system, is melted or maintained in the melted state, the heating system and the irradiation system still are controlled in such a manner that the heating system merely serves to heat the raw material powder to the second temperature that is lower than the first temperature, so that the shape-giving sintering and/or melting of the raw material powder occurs while the raw material powder is irradiated by the electromagnetic or particle radiation emitted by the irradiation system.

In the apparatus for producing a three-dimensional work piece, the raw material powder, by means of the heating system, may be very precisely and uniformly heated, for example, before being actually sintered in order to generate a layer of the three-dimensional work piece. Furthermore, the heating can be effected independent from the increase in the amount of raw material powder and in particular the increase in the height of the "stack" of raw material powder layers present on the carrier with increasing construction height of the work piece, as it is built up in layers from the raw material powder. Temperature gradients resulting from the difference between the temperature of raw material powder particles that are actually irradiated with electromagnetic or particle radiation emitted by the irradiation system and the temperature of raw material powder particles arranged outside of the irradiation zone as well as the temperature of already generated layers of the work piece thus can be minimized allowing thermal stresses within the work piece to be also minimized. Consequently, a crack-free high-strength and high-quality work piece can be obtained.

Since the sintering/melting radiation beam emitted by the irradiation system and the heating radiation beam emitted by the heating system originate from different planes, an undesired interaction of the radiation beams can easily be prevented even in case a large three-dimensional work piece is produced on a corresponding large carrier. Thus, the heating system and the irradiation system can easily be operated simultaneously so that raw material powder applied onto the carrier in one irradiation area may be irradiated by the heating radiation beam emitted by the heating system, while the raw material powder applied onto the carrier in a another irradiation area may be irradiated with the sintering/radiation beam emitted by the irradiation system. As a result, the generation of the three-dimensional work piece can be accelerated.

Preferably, the heating system comprises a first heating unit adapted to selectively irradiate electromagnetic or particle radiation onto the layer of raw material powder applied onto the carrier from a first heating radiation emission plane and a second heating unit to selectively irradiate electromagnetic or particle radiation onto the layer of raw material powder applied onto the carrier from a second heating radiation emission plane. The presence of plural heating units allows a uniform and reliable heating of the raw material powder even in case of the production of a large three-dimensional work piece. The first heating radiation emission plane and the second heating radiation emission plane may extend substantially parallel to each other. The first and the second heating unit then may simultaneously or successively emit heating radiation beams onto a layer of raw material applied onto the carrier which is disposed between the first and the second heating radiation emission plane.

The sintering/melting radiation emission plane may extend substantially parallel to the carrier. For example, a sintering/melting radiation beam emitted by the irradiation system may enter the process chamber accommodating the carrier via a top wall of the process chamber, i.e. the sintering/melting radiation beam emitted by the irradiation system may be directed through a window provided in the top wall of the process chamber. The first and/or the second heating radiation emission plane preferably extend(s) substantially perpendicular to the sintering/melting radiation emission plane. Furthermore, the second heating radiation emission plane may extend substantially parallel to the first heating radiation emission plane. In particular, a heating radiation beam emitted by the first heating unit may enter the process chamber accommodating the carrier via a first side wall of the process chamber, whereas a heating radiation beam emitted by the second heating unit may enter the process chamber accommodating the carrier via a second side wall of the process chamber which is disposed opposite and substantially parallel to the first side wall. For example, the heating radiation beams emitted by the first and the second heating unit may be directed through respective windows provided in the side walls of the process chamber.

The heating system preferably comprises at least one heating radiation source which is designed in the form of a laser diode. The irradiation system may comprise a sintering/melting radiation source which is designed in the form of a laser source, for example a diode pumped Ytterbium fiber laser. Preferably, a maximum output power of the heating radiation source of the heating system is lower than a maximum output power of the sintering/melting radiation source of the irradiation system. Furthermore, a laser light wavelength emitted by the heating radiation source may differ from a laser light wavelength emitted by the sintering/melting radiation source of the irradiation system. The raw material powder applied onto the carrier then can be heated with the aid of the heating system in a reliable and cost-effective manner.

As an alternative, it is, however, also conceivable to control the energy introduction into the raw material powder applied onto the carrier by the heating system for heating the raw material powder to the desired second temperature by suitably controlling a heating radiation beam size, a heating radiation pattern according to which the heating radiation beam is guided over the raw material powder and/or a scan speed at which the heating radiation beam is guided over the raw material powder applied onto the carrier. The energy introduction into the raw material powder applied onto the carrier by the irradiation system for heating the raw material powder to the desired first temperature and consequently sintering and/or melting the raw material powder may be controlled in a similar manner by suitably controlling a sintering/melting radiation beam size, a sintering/melting radiation pattern according to which the sintering/melting radiation beam is guided over the raw material powder and/or a scan speed at which the sintering/melting radiation beam is guided over the raw material powder applied onto the carrier.

The radiation pattern according to which the heating radiation beam emitted by the heating system and the sintering/melting radiation beam emitted by the irradiation system are guided over the raw material powder applied onto the carrier may be any suitable radiation pattern, for example a chessboard pattern, a stripe pattern or a pattern comprising arbitrarily shaped sections, wherein the individual sections of the radiation pattern may be defined by a plurality of scan vectors. The heating radiation beam emitted by the heating system may be guided over the raw material powder applied onto the carrier according to a radiation pattern which differs from the radiation pattern according to which the sintering/melting radiation beam emitted by the irradiation system is guided over the raw material powder applied onto the carrier. It is, however, also conceivable that the radiation patterns according to which the heating radiation beam emitted by the heating system and the sintering/melting radiation beam emitted by the irradiation system are guided over the raw material powder applied onto the carrier are of the same type, but differ in their hatch distances, i.e. the distances between adjacent hatches of the radiation pattern.

The control unit may be adapted to control the operation of the heating system and/or the operation of the irradiation system in dependence on temperature signals indicative of the temperature of the raw material powder during being irradiated by the heating radiation beam emitted by the heating system and/or the sintering/melting radiation beam emitted by the irradiation system. By measuring the temperature of the raw material powder upon being irradiated by the heating system and/or the irradiation system, the heating of the raw material powder to the first and/or the second temperature can be controlled in a reliable manner. The temperature signals which are used for controlling the operation of heating system and the irradiation system preferable are provided by a pyrometer and/or a thermal imaging camera.

The control unit may be adapted to control the operation of the irradiation system and the heating system in such a manner that the layer of raw material powder applied onto the carrier first is selectively irradiated with electromagnetic or particle radiation emitted by the heating system and thereafter is selectively irradiated with electromagnetic or particle radiation emitted by the irradiation system. By first preheating the raw material powder to a desired second temperature before actually sintering/melting the raw material powder at a higher first temperature in order to generate a layer of the three-dimensional work piece, thermal stresses within the work piece to be generated can be reliably minimized. For example, the second temperature may be 200° C. or higher.

Alternatively or additionally thereto, the control unit may be adapted to control the operation of the irradiation system and the heating system in such a manner that the layer of raw material powder applied onto the carrier first is selectively irradiated with electromagnetic or particle radiation emitted by the irradiation system and thereafter is selectively irradiated with electromagnetic or particle radiation emitted by the heating system. Similar to preheating, also postheating the already sintered/melted raw material powder allows the reduction of thermal stresses within the work piece to be generated. Furthermore, postheating may be used to custom tailor the material characteristics of the work piece, for example by maintaining the raw material powder in the melted state for a desired period of time or by site-selectively temperature treating, i.e. "annealing" the sintered raw material powder.

Equipping an apparatus for producing a three-dimensional work piece with a control which is adapted to control the operation of the irradiation system and the heating system in such a manner that the layer of raw material powder applied onto the carrier first is selectively irradiated with electromagnetic or particle radiation emitted by the irradiation system and thereafter is selectively irradiated with electromagnetic or particle radiation emitted by the heating system may be claimed independently from equipping the apparatus with an irradiation system which is adapted to selectively irradiate electromagnetic or particle radiation onto the layer of raw material powder applied onto the carrier from a sintering/melting radiation emission plane and a heating system which is adapted to selectively irradiate electromagnetic or particle radiation onto the layer of raw material powder applied onto the carrier from a heating radiation emission plane that is different from the sintering/melting radiation emission plane.

Specifically, an apparatus for producing a three-dimensional work piece may be claimed which comprises a carrier adapted to receive a layer of raw material powder, a control unit, an irradiation system adapted to selectively irradiate electromagnetic or particle radiation onto the layer of raw material powder applied onto the carrier, and a heating system adapted to selectively irradiate electromagnetic or particle radiation onto the layer of raw material powder applied onto the carrier. The control unit may be adapted to control the operation of the irradiation system and the heating system in such a manner that the raw material powder first is selectively irradiated with electromagnetic or particle radiation emitted by the irradiation system so as to heat the raw material powder to a first temperature which allows sintering and/or melting of the raw material powder in order to generate a layer of the three-dimensional work piece and thereafter is selectively irradiated with electromagnetic or particle radiation emitted by the heating system to a second temperature that is lower than the first temperature. A corresponding method may also be claimed.

In a preferred embodiment of the apparatus for producing a three-dimensional work piece the control unit is adapted to control the operation of the irradiation system and the heating system in such a manner that an electromagnetic or particle radiation beam emitted by the heating system and an electromagnetic or particle radiation beam emitted by the irradiation system are irradiated onto the layer of raw material powder applied onto the carrier at a desired distance and/or with a desired time lag. Upon starting irradiating a new layer of raw material powder, the control unit may control the operation of the irradiation system and the heating system in such a manner that only the heating system emits a heating radiation beam while the irradiation system remains inoperative until the sintering/melting radiation beam emitted by the irradiation system can be guided across the raw material powder layer at the desired distance and/or with the desired time lag. In a similar manner, the control unit, upon starting irradiating a new layer of raw material powder, may control the operation of the irradiation system and the heating system in such a manner that only the irradiation system emits a sintering/melting radiation beam while the heating system remains inoperative until the heating radiation beam emitted by the heating system can be guided across the raw material powder layer at the desired distance and/or with the desired time lag.

The control unit may be adapted to set the desired distance and/or the desired time lag in dependence on raw material powder characteristics and/or process parameters of the raw material powder application and/or the irradiation process. Raw material powder characteristic that may influence the setting of the desired distance and/or the desired time lag may include the melting temperature as well as the overall sintering/melting properties of the powder. Process parameters that may influence the setting of the desired distance and/or the desired time lag may include the thickness of the powder layer applied onto the carrier, the size of the heating radiation beam and/or the sintering/melting radiation beam, the heating radiation pattern and/or the sintering/melting radiation pattern according to which the heating radiation beam and/or the sintering/melting radiation beam is/are guided over the raw material powder, and/or the scan speed at which the heating radiation beam and/or the sintering/melting radiation beam is/are guided over the raw material powder.

A method for producing a three-dimensional work piece comprises the steps of applying a layer of raw material powder onto a carrier, selectively irradiating electromagnetic or particle radiation onto the layer of raw material powder applied onto the carrier from a sintering/melting radiation emission plane by means of an irradiation system, wherein the operation of the irradiation system is controlled in such a manner that the raw material powder is heated to a first temperature which allows sintering and/or melting of the raw material powder in order to generate a layer of the three-dimensional work piece, and selectively irradiating electromagnetic or particle radiation onto the layer of raw material powder applied onto the carrier from a heating radiation emission plane that is different from the sintering/melting radiation emission plane by means of a heating system, wherein the operation of the heating system is controlled in such a manner that the raw material powder is heated to a second temperature that is lower than the first temperature.

Preferably, a first heating unit of the heating system selectively irradiates electromagnetic or particle radiation onto the layer of raw material powder applied onto the carrier from a first heating radiation emission plane and a second heating unit selectively irradiates electromagnetic or particle radiation onto the layer of raw material powder applied onto the carrier from a second heating radiation emission plane. The first heating radiation emission plane and the second irradiation emission plane may extend substantially parallel to each other.

The sintering/melting radiation emission plane may extend substantially parallel to the carrier. Additionally or alternatively thereto, the first and/or the second radiation emission plane may extend substantially perpendicular to the sintering/melting radiation emission plane.

The operation of the irradiation system and the heating system may be controlled in such a manner that the layer of raw material powder applied onto the carrier first is selectively irradiated with electromagnetic or particle radiation emitted by the heating system and thereafter is selectively irradiated with electromagnetic or particle radiation emitted by the irradiation system.

Alternatively or additionally thereto, the operation of the irradiation system and the heating system may, however, also be controlled in such a manner that the layer of raw material powder applied onto the carrier first is selectively irradiated with electromagnetic or particle radiation emitted by the irradiation system and thereafter is selectively irradiated with electromagnetic or particle radiation emitted by the heating system.

The operation of the irradiation system and the heating system may be controlled in such a manner that an electromagnetic or particle radiation beam emitted by the heating system and an electromagnetic or particle radiation beam emitted by the irradiation system are irradiated onto the layer of raw material powder applied onto the carrier at a desired distance and/or with a desired time lag.

The desired distance and/or the desired time lag may be set in dependence on raw material powder characteristics and/or process parameters of the raw material powder application and/or the irradiation process.

Preferred embodiments of the invention in the following are explained in greater detail with reference to the accompanying schematic drawings, in which:

DETAILED DESCRIPTION OF THE ILLUSTRATIVE EMBODIMENTS

Figure 1:
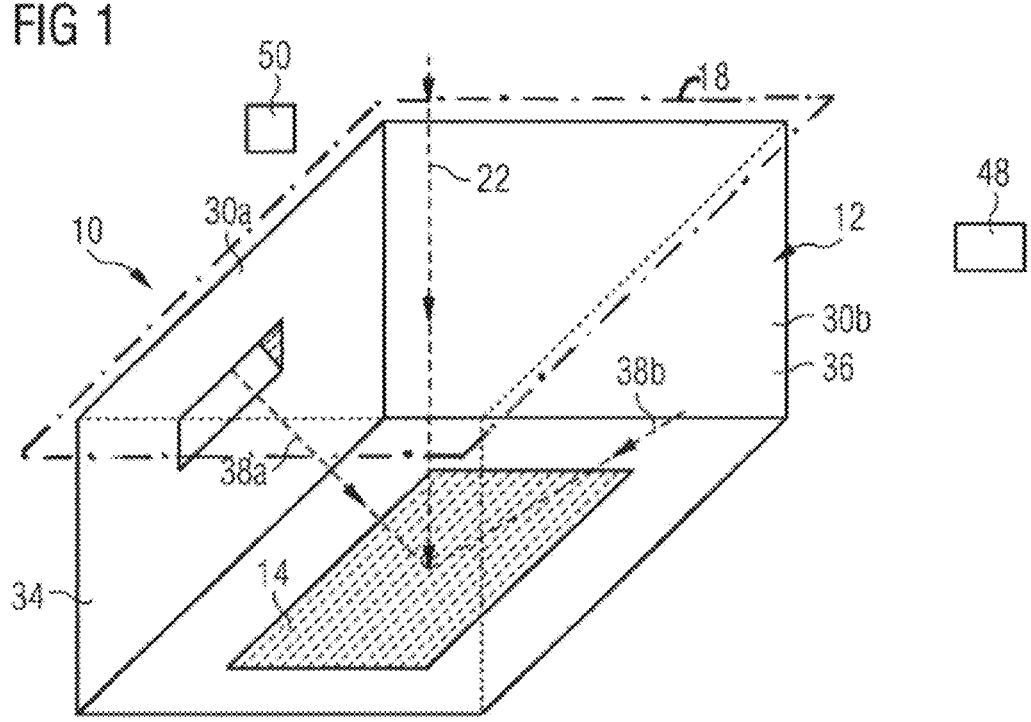
FIG. 1 shows a schematic three-dimensional representation of an apparatus for producing three-dimensional work pieces.
Figure 2:
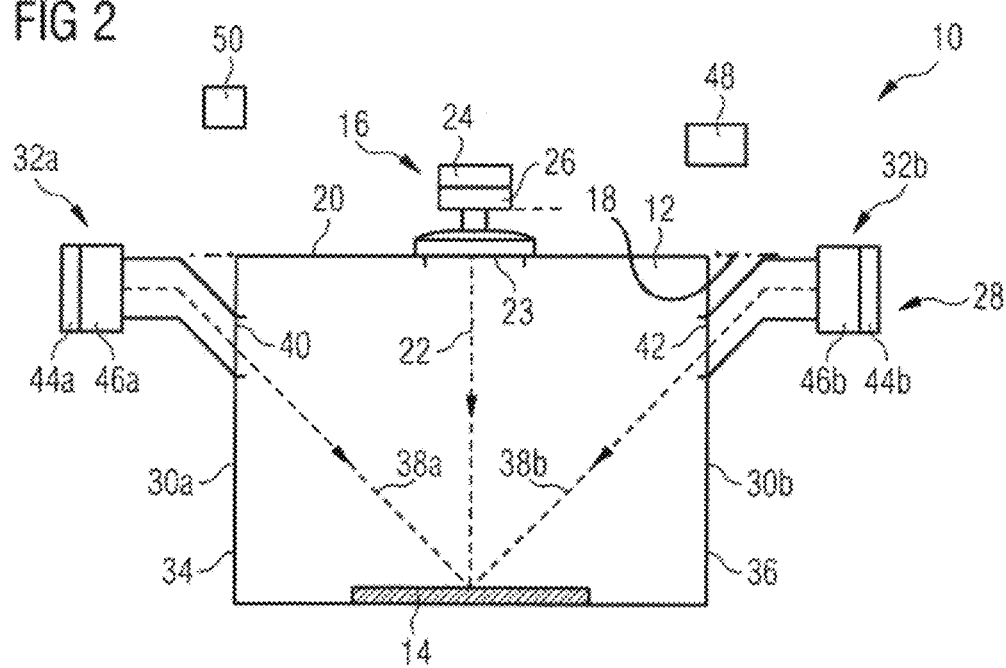
FIG. 2 shows a schematic sectional view of the apparatus depicted in FIG. 1.

FIGS. 1 and 2 show an apparatus 10 for producing three-dimensional work pieces by powder bed fusion. The apparatus 10 comprises a process chamber 12. The process chamber 12 is sealable against the ambient atmosphere, i.e. against the environment surrounding the process chamber 12. A powder application device (not shown), which is disposed in the process chamber 12, serves to apply a raw material powder onto a carrier 14. The carrier 14 is designed to be displaceable in a vertical direction so that, with increasing construction height of a work piece, as it is built up in layers from the raw material powder on the carrier 14, the carrier 14 can be moved downwards in the vertical direction.

The apparatus 10 further comprises an irradiation system 16 for selectively irradiating electromagnetic or particle radiation onto the layer of raw material powder applied onto the carrier 14 from a sintering/melting radiation emission plane 18. In the embodiment of an apparatus 10 shown in the drawings, the sintering/melting radiation emission plane 18 extends substantially parallel to the carrier 14 and substantially coplanar with a top wall 20 of the process chamber 12. In particular, a sintering/melting radiation beam 22 emitted by the irradiation system 16 enters the process chamber 12 through a window 23 provided in the top wall 20 of the process chamber 12.

The irradiation system 16 comprises a sintering/melting radiation source 24 which, in the embodiment of an apparatus 10 shown in the drawings, is designed as a laser source, for example a diode pumped Ytterbium fibre laser emitting laser light at a wavelength of approximately 1070 to 1080 nm. Further, the irradiation system 16 comprises an optical unit 26 for guiding and/or processing the sintering/melting radiation beam 22 emitted by the sintering/melting radiation source 24. The optical unit 26 may comprise a beam expander for expanding the radiation beam, a scanner and an object lens. Alternatively, the optical unit 26 may comprise a beam expander including a focusing optic and a scanner unit. By means of the scanner unit, the position of the focus of the sintering/melting radiation beam both in the direction of the beam path and in a plane perpendicular to the beam path can be changed and adapted. The scanner unit may be designed in the form of a galvanometer scanner and the object lens may be an f-theta object lens. Hence, by means of the irradiation system 16, the raw material powder applied onto the carrier 14 may be subjected to laser radiation in a site-selective manner in dependence on the desired geometry of the work piece that is to be produced.

The apparatus 10 also comprises a heating system 28 which is adapted to selectively irradiate electromagnetic or particle radiation onto the layer of raw material powder applied onto the carrier 14 from a heating radiation emission plane 30a, 30b that is different from the sintering/melting radiation emission plane 18. In the embodiment of an apparatus 10 shown in the drawings, the heating radiation emission plane 30a, 30b extends substantially perpendicular to the sintering/melting radiation emission plane 18 and hence substantially perpendicular to the carrier 14 as well as the top wall 20 of the process chamber 12.

Specifically, the heating system 28 comprises a first heating unit 32a adapted to selectively irradiate electromagnetic or particle radiation onto the layer of raw material powder applied onto the carrier 14 from a first heating radiation emission plane 30a and a second heating unit 32b adapted to selectively irradiate electromagnetic or particle radiation onto the layer of raw material powder applied onto the carrier 14 from a second heating radiation emission plane 30b. The first heating radiation emission plane 30a and the second irradiation emission plane 30b extend substantially opposed and parallel to each other and substantially coplanar with two opposing side walls 34, 36 of the process chamber 12. Heating radiation beams 38a, 38b emitted by the heating units 32a, 32b of the heating system 28 enter the process chamber 12 through respective windows 40, 42 provided in the side walls 34, 36 of the process chamber 12.

Each heating unit 32a, 32b of the heating system 28 comprises a heating radiation source 44a, 44b which, in the embodiment of an apparatus 10 shown in the drawings, is designed as a laser diode. Further, each heating unit 32a, 32b of the heating system 28 comprises an optical unit 46a, 46b for guiding and/or processing the respective heating radiation beam 38a, 38b emitted by the respective heating radiation source 44a, 44b. Similar to the optical unit 26 of the irradiation system 16, each optical unit 46a, 46b of the heating system 28 may comprise a beam expander for expanding the radiation beam, a scanner and an object lens. Alternatively, each optical units 44a, 44b may comprise a beam expander including a focusing optic and a scanner unit. By means of the scanner unit, the position of the focus of the heating radiation beam both in the direction of the beam path and in a plane perpendicular to the beam path can be changed and adapted. The scanner unit may be designed in the form of a galvanometer scanner and the object lens may be an f-theta object lens. Hence, by means of the heating system 28, the raw material powder applied onto the carrier 14 also may be subjected to laser radiation in a site-selective manner in dependence on the desired geometry of the work piece that is to be produced.

The operation of the irradiation system 16 and the operation of the heating system 28 are controlled by means of control unit 48. Specifically, the control unit 48 controls the operation of the irradiation system 16 in such a manner that the raw material powder is heated to a first temperature T1 which allows sintering and/or melting of the raw material powder in order to generate a layer of the three-dimensional work piece. Furthermore, the control unit 48 controls the operation of the heating system 28 in such a manner that the raw material powder is heated to a second temperature T2 that is lower than the first temperature T1. For controlling the operation of the heating system 28 and the operation of the irradiation system 16, the control unit 48 receives temperature signals indicative of the temperature of the raw material powder during being irradiated by the heating radiation beams 38a, 38b emitted by the heating system 28 and the sintering/melting radiation beam 22 emitted by the irradiation system 16. These temperature signals are provided by a temperature measuring device 50 which may be designed in the form of a pyrometer and/or a thermal imaging camera.

The control unit 48 may control the operation of the irradiation system 16 and the heating system 28 in such a manner that the layer of raw material powder applied onto the carrier 14 first is selectively irradiated with electromagnetic or particle radiation emitted by the heating system 28 and thereafter is selectively irradiated with electromagnetic or particle radiation emitted by the irradiation system 16. By first preheating the raw material powder to a desired second temperature T2 before actually sintering/melting the raw material powder at a higher first temperature T1 in order to generate a layer of the three-dimensional work piece, thermal stresses within the work piece to be generated can be reliably minimized. For example, the second temperature T2 may be 200° C. or higher.

Alternatively or additionally thereto, the control unit 48 may control the operation of the irradiation system 16 and the heating system 28 in such a manner that the layer of raw material powder applied onto the carrier 14 first is selectively irradiated with electromagnetic or particle radiation emitted by the irradiation system 16 and thereafter is selectively irradiated with electromagnetic or particle radiation emitted by the heating system 28. Similar to preheating, also postheating the already sintered/melted raw material powder allows the reduction of thermal stresses within the work piece to be generated. Furthermore, postheating may be used to custom tailor the material characteristics of the work piece, for example by maintaining the raw material powder in the melted state for a desired period of time or by site-selectively temperature treating, i.e. "annealing" the sintered raw material powder.

In the apparatus 10 depicted in the drawings, wherein the heating system 28 is equipped with two heating units 32a, 32b, both heating radiation beams 38a, 38b emitted by the heating units 32a, 32b may be used either for preheating or for postheating the raw material powder on the carrier 14 either simultaneously or subsequently. It is, however, also conceivable that the control unit 48 controls the operation of the heating system 28 in such a manner that a heating radiation beam 38a emitted by the first heating unit 32a is used for preheating the raw material powder on the carrier 14 before the raw material powder eventually is sintered/melted, whereas a heating radiation beam 38b emitted by the second heating unit 32b is used for postheating already sintered/melted raw material powder or vice versa.

Specifically, the control unit 48 controls the operation of the irradiation system 16 and the heating system 28 in such a manner that an electromagnetic or particle radiation beam 38a, 38b emitted by the heating system 28 and an electromagnetic or particle radiation beam 22 emitted by the irradiation system 16 are irradiated onto the layer of raw material powder applied onto the carrier 14 at a desired distance and/or with a desired time lag. The desired distance and/or the desired time lag may be set by means of the control unit 48 in dependence on raw material powder characteristics and/or process parameters of the raw material powder application and/or the irradiation process. Raw material powder characteristic that may influence the setting of the desired distance and/or the desired time lag may include the melting temperature as well as the overall sintering/melting properties of the powder. Process parameters that may influence the setting of the desired distance and/or the desired time lag may include the thickness of the powder layer applied onto the carrier 14, the size of the heating radiation beam 38a, 38b and/or the sintering/melting radiation beam 22, the heating radiation pattern and/or the sintering/melting radiation pattern according to which the heating radiation beam 38a, 38b and/or the sintering/melting radiation beam 22 is/are guided over the raw material powder, and/or the scan speed at which the heating radiation beam 38a, 38b and/or the sintering/melting radiation beam 22 is/are guided over the raw material powder.

In case preheating of the raw material powder as described above is desired, upon starting irradiating a new layer of raw material powder, the control unit 48 controls the operation of the irradiation system 16 and the heating system 28 in such a manner that only the heating system 28 emits a heating radiation beam 38a, 38b while the irradiation system 16 remains inoperative until the sintering/melting radiation beam 22 emitted by the irradiation system 16 can be guided across the raw material powder layer at the desired distance and/or with the desired time lag. In a similar manner, in case postheating of the raw material power is desired, the control unit 48, upon starting irradiating a new layer of raw material powder, controls the operation of the irradiation system 16 and the heating system 28 in such a manner that only the irradiation system 16 emits a sintering/melting radiation beam while the heating system 28 remains inoperative until the heating radiation beam 38a, 38b emitted by the heating system 28 can be guided across the raw material powder layer at the desired distance and/or with the desired time lag.

The invention claimed is:

1. An apparatus for producing a three-dimensional work piece comprising:
   a process chamber,
   a carrier disposed in the process chamber and adapted to receive a layer of raw material powder,
   a control unit,
   an irradiation system adapted to selectively irradiate electromagnetic or particle radiation onto the layer of raw material powder applied onto the carrier, wherein the electromagnetic or particle radiation is irradiated from a sintering/melting radiation emission plane to the layer of raw material powder, wherein the electromagnetic or particle radiation irradiated by the irradiation system enters the process chamber via a top wall of the process chamber, and wherein the control unit is adapted to control the operation of the irradiation system in such a manner that the raw material powder is heated to a first temperature which allows sintering and/or melting of the raw material powder in order to generate a layer of the three-dimensional work piece, and
   a heating system adapted to selectively irradiate electromagnetic or particle radiation onto the layer of raw material powder applied onto the carrier from a heating radiation emission plane that is different from the sintering/melting radiation emission plane, wherein the electromagnetic or particle radiation irradiated by the heating system enters the process chamber via a side wall of the process chamber, and wherein the control unit is adapted to control the operation of the heating system in such a manner that the raw material powder is heated to a second temperature that is lower than the first temperature.

2. The apparatus according to claim 1, wherein the heating system comprises a first heating unit adapted to selectively irradiate electromagnetic or particle radiation onto the layer of raw material powder applied onto the carrier from a first heating radiation emission plane via a first side wall of the process chamber and a second heating unit to selectively irradiate electromagnetic or particle radiation onto the layer of raw material powder applied onto the carrier from a second heating radiation emission plane via a second side wall of the process chamber, and wherein the first heating radiation emission plane and the second heating radiation emission plane extend substantially parallel to each other.

3. The apparatus according to claim 1, wherein the sintering/melting radiation emission plane extends substantially parallel to the carrier.

4. The apparatus according to claim 2, wherein at least one of the first and the second heating radiation emission plane extends substantially perpendicular to the sintering/melting radiation emission plane.

5. The apparatus according to claim 1, wherein the heating system comprises at least one heating radiation source which is designed in the form of a laser diode.

6. The apparatus according to claim 1, wherein the control unit is adapted to control the operation of the irradiation system and the heating system in such a manner that the layer of raw material powder applied onto the carrier first is selectively irradiated with electromagnetic or particle radiation emitted by the heating system and thereafter is selectively irradiated with electromagnetic or particle radiation emitted by the irradiation system.

7. The apparatus according to claim 1, wherein the control unit is adapted to control the operation of the irradiation system and the heating system in such a manner that the layer of raw material powder applied onto the carrier first is selectively irradiated with electromagnetic or particle radiation emitted by the irradiation system and thereafter is selectively irradiated with electromagnetic or particle radiation emitted by the heating system.

8. The apparatus according to claim 5, wherein the control unit is adapted to control the operation of the irradiation system and the heating system in such a manner that an electromagnetic or particle radiation beam emitted by the heating system and an electromagnetic or particle radiation beam emitted by the irradiation system are irradiated onto the layer of raw material powder applied onto the carrier at a desired distance and/or with a desired time lag.

9. The apparatus according to claim 8, wherein the control unit is adapted to set at least one of the desired distance and the desired time lag in dependence on at least one of raw material powder characteristics, process parameters of the raw material powder application and the irradiation process.

10. An apparatus for producing a three-dimensional work piece, the apparatus comprising:
a process chamber,
a carrier disposed in the process chamber and adapted to receive a layer of raw material powder,
an irradiation system adapted to selectively irradiate electromagnetic or particle radiation onto the layer of raw material powder applied onto the carrier, wherein the electromagnetic or particle radiation enters the process chamber via a top wall of the process chamber in use of the apparatus, and
a heating system adapted to selectively irradiate electromagnetic or particle radiation onto the layer of raw material powder applied onto the carrier, wherein the electromagnetic or particle radiation irradiated by the heating system enters the process chamber via a side wall of the process chamber in use of the apparatus.

11. The apparatus of claim 10, wherein the heating system comprises a first heating unit adapted to selectively irradiate electromagnetic or particle radiation onto the layer of raw material powder applied onto the carrier from a first heating radiation emission plane via a first side wall of the process chamber and a second heating unit to selectively irradiate electromagnetic or particle radiation onto the layer of raw material powder applied onto the carrier from a second heating radiation emission plane via a second side wall of the process chamber, and wherein the first heating radiation emission plane and the second heating radiation emission plane extend substantially parallel to each other.

12. The apparatus of claim 11, wherein the electromagnetic or particle radiation is irradiated by the irradiation system from a sintering/melting radiation emission plane to the layer of raw material powder, and wherein at least one of the first and the second heating radiation emission plane extends substantially perpendicular to the sintering/melting radiation emission plane.

13. The apparatus of claim 10, further comprising a control unit, wherein the control unit is adapted to control the operation of the irradiation system in such a manner that the raw material powder is heated to a first temperature which allows sintering and/or melting of the raw material powder in order to generate a layer of the three-dimensional work piece, and wherein the control unit is adapted to control the operation of the heating system in such a manner that the raw material powder is heated to a second temperature that is lower than the first temperature.

14. The apparatus of claim 13, wherein the control unit is adapted to control the operation of the irradiation system and the heating system in such a manner that the layer of raw material powder applied onto the carrier first is selectively irradiated with electromagnetic or particle radiation emitted by the heating system and thereafter is selectively irradiated with electromagnetic or particle radiation emitted by the irradiation system.

15. The apparatus of claim 13, wherein the control unit is adapted to control the operation of the irradiation system and the heating system in such a manner that the layer of raw material powder applied onto the carrier first is selectively irradiated with electromagnetic or particle radiation emitted by the irradiation system and thereafter is selectively irradiated with electromagnetic or particle radiation emitted by the heating system.

16. The apparatus of claim 13, wherein the control unit is adapted to control the operation of the irradiation system and the heating system in such a manner that an electromagnetic or particle radiation beam emitted by the heating system and an electromagnetic or particle radiation beam emitted by the irradiation system are irradiated onto the layer of raw material powder applied onto the carrier at a desired distance and/or with a desired time lag.

17. The apparatus of claim 16, wherein the control unit is adapted to set at least one of the desired distance and the desired time lag in dependence on at least one of raw material powder characteristics, process parameters of the raw material powder application and the irradiation process.

18. An apparatus for producing a three-dimensional work piece, the apparatus comprising:
a process chamber,
a carrier disposed in the process chamber and adapted to receive a layer of raw material powder,
an irradiation system adapted to selectively irradiate electromagnetic or particle radiation onto the layer of raw material powder applied onto the carrier, wherein the electromagnetic or particle radiation enters the process chamber via a top wall of the process chamber in use of the apparatus,
a heating system adapted to selectively irradiate electromagnetic or particle radiation onto the layer of raw material powder applied onto the carrier, wherein the electromagnetic or particle radiation irradiated by the heating system enters the process chamber via a side wall of the process chamber in use of the apparatus, and
a control unit, wherein the control unit is adapted to control the operation of the irradiation system in such a manner that the raw material powder is heated to a first temperature which allows sintering and/or melting of the raw material powder in order to generate a layer of the three-dimensional work piece, and wherein the control unit is adapted to control the operation of the heating system in such a manner that the raw material powder is heated to a second temperature that is lower than the first temperature.

19. The apparatus of claim 18, wherein the heating system comprises a first heating unit adapted to selectively irradiate electromagnetic or particle radiation onto the layer of raw material powder applied onto the carrier from a first heating radiation emission plane via a first side wall of the process chamber and a second heating unit to selectively irradiate electromagnetic or particle radiation onto the layer of raw material powder applied onto the carrier from a second heating radiation emission plane via a second side wall of the process chamber, and wherein the first heating radiation emission plane and the second heating radiation emission plane extend substantially parallel to each other.

20. The apparatus of claim 19, wherein the electromagnetic or particle radiation is irradiated by the irradiation system from a sintering/melting radiation emission plane to the layer of raw material powder, and wherein at least one of the first and the second heating radiation emission plane extends substantially perpendicular to the sintering/melting radiation emission plane.

* * * * *